United States Patent

Proops

[15] 3,656,145

[45] Apr. 11, 1972

[54] VENDING AND RECORDING APPARATUS

[72] Inventor: Sydney E. Proops, London, England

[73] Assignee: Quickmaid Rental Service Limited, London, England

[22] Filed: Mar. 10, 1969

[21] Appl. No.: 805,688

[30] Foreign Application Priority Data

Mar. 8, 1968 Great Britain ......................11,441/68

[52] U.S. Cl. ................................340/310, 340/150, 222/30

[51] Int. Cl. ....................................................G08c 19/12

[58] Field of Search .........................................340/310, 203

[56] References Cited

UNITED STATES PATENTS

| | | | |
|---|---|---|---|
| 2,429,259 | 10/1947 | Bugg | 340/203 |
| 3,211,111 | 10/1965 | Morley | 340/310 |
| 3,234,543 | 2/1966 | Thompson | 340/310 |
| 3,264,633 | 8/1966 | Hellar | 340/310 |
| 3,389,388 | 6/1968 | Helsing | 340/310 |
| 3,365,700 | 1/1968 | Cortner | 340/408 |
| 3,460,121 | 8/1969 | Wattenburg | 340/310 |

*Primary Examiner*—Thomas B. Habecker
*Attorney*—Woodhams, Blanchard and Flynn

[57] ABSTRACT

The invention relates to vending and recording apparatus in which an signal generator is actuated when an article is dispensed from the vending machine to transmit modulated carrier frequency signals over a physical line, having a receiving station having a signal receiving and recording apparatus for receiving, demodulating and amplifying carrier frequency signals and for recording cost unit signals representative of the value of the dispensed article.

8 Claims, 3 Drawing Figures

Figure 1:
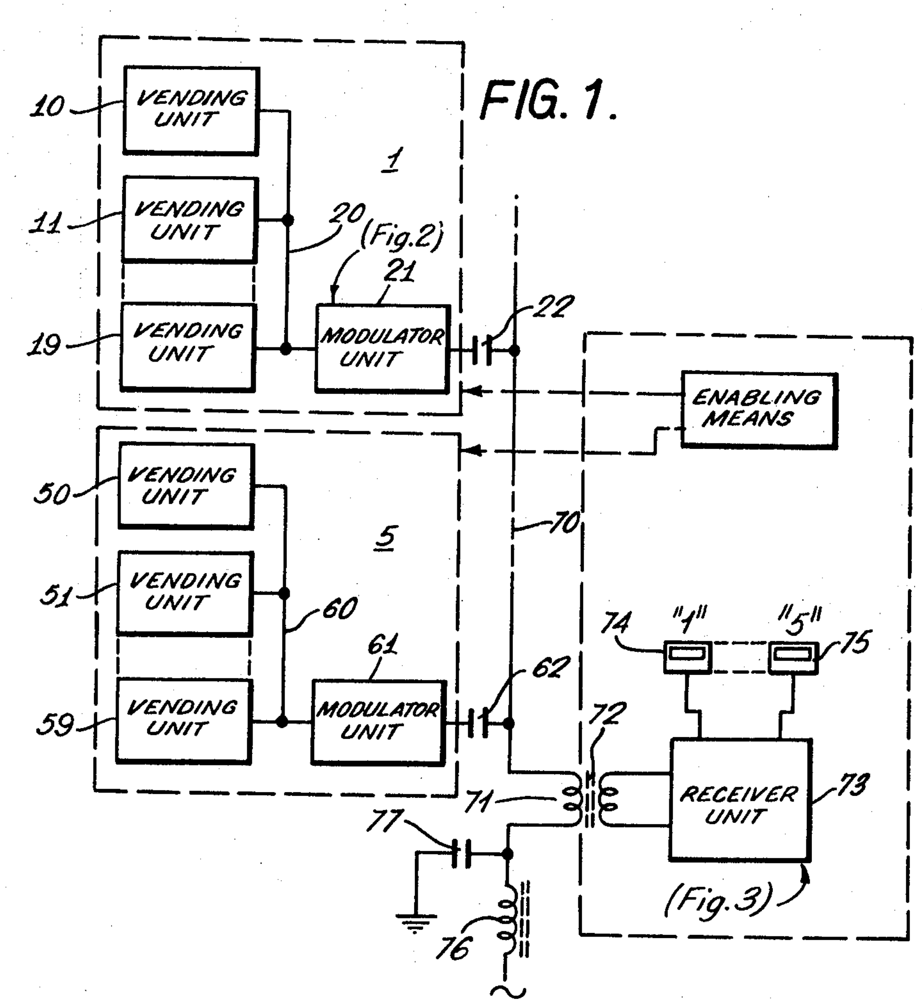

INVENTOR
SYDNEY E. PROOPS
BY
Woodhams, Blanchard & Flynn
ATTORNEYS

INVENTOR
SYDNEY E. PROOPS
BY Woodhams, Blanchard & Flynn
ATTORNEYS

INVENTOR
SYDNEY E. PROOPS

BY Woodhams Blanchard & Flynn
ATTORNEYS

VENDING AND RECORDING APPARATUS

The invention relates to the remote control of vending machines.

It is an object of the invention to be able to record at a control unit the sales made by one or more vending machines without requiring a complex wiring system between the vending machines and the control unit.

The present known type of vending machines, for example for use in hotel rooms, which are controlled and monitored by a control unit have to have their own complex system of wiring which is costly and inconvenient to install.

It is a further object of the invention to utilise the existing wiring, for example the mains wiring circuit, in the building in which the machines are installed.

The invention consists in vending and recording apparatus comprising one or more vending machines, signal generating means comprising a carrier frequency generator, means for modulating a carrier frequency with signals representing cost units indicative of the value of a dispensed article to obtain, when an article is dispensed from the vending machine, modulated carrier frequency signals capable of being transmitted over a physical transmission line, and signal receiving and recording apparatus for receiving, demodulating, and amplifying said carrier frequency signals and for recording and indicating a signal output representing the value of the dispensed article.

The modulating means may be arranged to perform repeated modulation, for example the modulating means may comprise a pulse generator delivering a pulse train, means for modulating an audio frequency by said pulse train and further modulating means for modulating a radio frequency carrier wave by the product of the first modulation.

Furthermore the invention consists in vending and recording apparatus comprising a plurality of vending machines, a signal generator for each vending machine, or a group of machines, comprising a generator of a carrier frequency individual to said machine, or to a group of machines, means for actuating said signal generator when an article is dispensed from the vending machine to obtain a modulated carrier frequency, a common transmission line connecting said machine or machines to a signal receiving and recording apparatus for receiving, demodulating and amplifying said carrier signals and for recording and indicating a signal output representing the value of the dispensed article.

According to the invention furthermore there is provided apparatus for the transmission of information in the form of electrical pulses from a plurality of vending machines to a control unit along a transmission path common to said plurality of vending machines in which each vending machine is provided with a transmitter which is able to transmit along the electrical conductor a carrier frequency modulated with a suitable pulse and in which the control unit is provided with means for receiving the modulated pulse, demodulating the carrier, identifying the modulating pulse and actuating a counter for recording the number of modulating pulses.

According to the invention furthermore apparatus in which the control unit is provided with a transmitter which is able to transmit on the electrical conductor a continuous carrier frequency and one or more suitable pulses to modulate the carrier and in which each vending machine is provided with a receiver which may be powered continuously and which is able to cause a control relay to actuate the vending machine ready for vending, on receipt from the control unit of a predetermined pulse carried on the carrier.

The invention is of use in a hotel, where vending machines are disposed in each of the guests rooms and a record of the purchase each guest makes is recorded at a central control unit.

Each vending machine is provided with a transmitter which is provided with actuating power from D.C. pulses which are produced by a relay in the vending machine when a button appropriate to the commodity required, is pressed.

The said transmitter when given a D.C. pulse, gives out a carrier frequency modulated with a pulse of suitable frequency. Each vending machine is provided with a different frequency so as to provide identification.

The output signal from each vending machine transmitter may be impressed on the electrical supply to the vending machine or on any other convenient wiring system which may be installed in the hotel.

The said output signal from each transmitter is extracted from the wiring system at a control point by a receiver unit. The receiver unit consists of means to amplify and demodulate the carrier and after further amplification will filter out and separate the signal from each independent vending machine to operate a counter, for example a veeder type counter. Each vending machine has its own veeder type counter which will respond to and record any number of frequency pulses carried on the carrier thus recording the sales by means of unit charges made by the vending machine concerned. Each pulse represents one unit charge. Thus if a commodity costing 10 shillings is purchased, and the vending machine is working on 1 shilling units then the vending machine will transmit 10 pulses to the control unit thus registering 10 units on the veeder type counter.

It is possible to switch the vending machine to a state ready for operation from the control unit. To do this a transmitter is provided at the control unit which sends out a continuous carrier frequency into the wiring system. When an individual vending machine is required to be switched on ready for operation the carrier is modulated by a suitable frequency allocated to the required machine.

The vending machine will be fitted with a receiver which is connected to the wiring system. This receiver will be powered all the time and the receipt of the modulated carrier appropriate to that vending machine will cause a control relay in the vending machine to operate and thus prepare it for vending. Thus in the event of a break in the wiring system the modulated switching pulse will cease thus causing the vending machine to be switched off.

The carrier frequencies used for the operation of the switching and charge counting will differ by more than the sidebands to avoid beating together and producing intermodulations products which could be demodulated to give false pulse switching or charge registration.

It is to be understood that it is possible to use electronic counters or any other form of counters in place of the veeder type counters.

Figure 2:
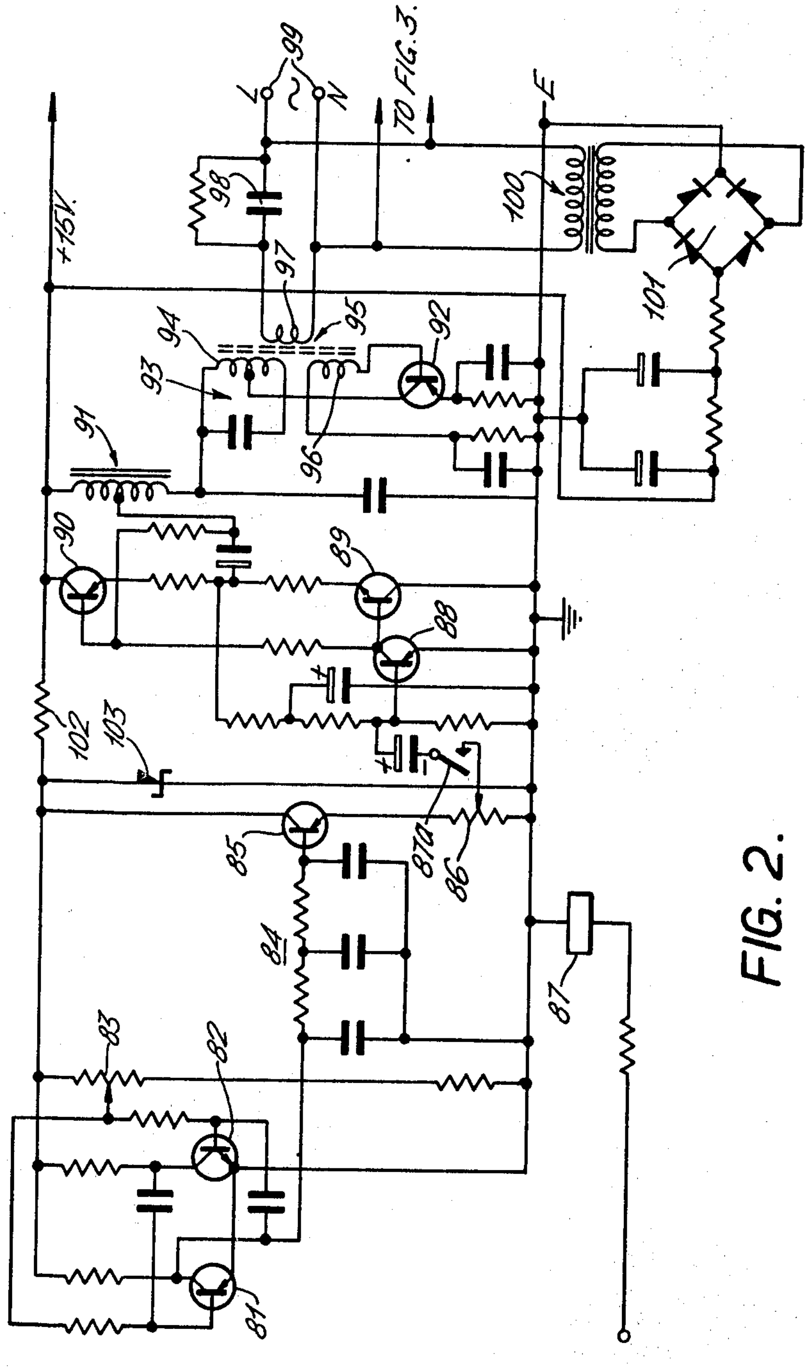
Figure 3:
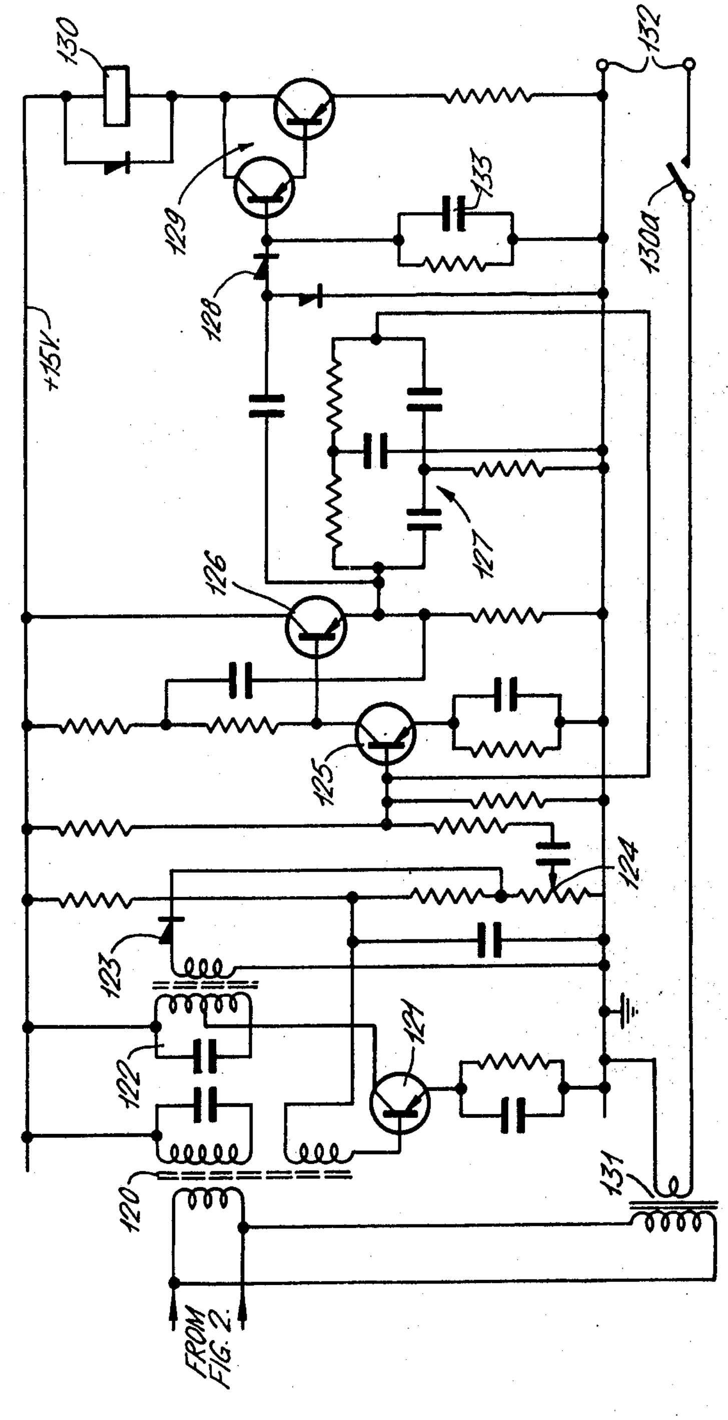

Feature and advantages of a vending system in accordance with the present invention will become apparent from the following description, taken in conjunction with the accompanying drawings, in which:

FIG. 1 is a schematic diagram indicative of the general nature of a vending system, FIG. 2 is a circuit diagram of one embodiment of an element of the apparatus shown in FIG. 1, and FIG. 3 is a circuit diagram of one embodiment of another element of the apparatus shown in FIG. 1.

In FIG. 1, two vending positions are denoted generally by references 1 and 5. These positions are representative of a plurality of such vending positions, all of which are generally alike and differ only insofar as is hereinafter described in detail. Each position includes a number of vending units 10, 11, 19 and 50, 51, 59, the actual number being variable as desired. Each vending unit will supply goods on demand and in response to its actuation to deliver an item of goods will supply to an electrical conductor 20, 60 a pulse signal representing in some predetermined manner the value of the goods supplied. These pulse signals are applied to a modulator device 21, 61 in which they are used to modulate a respective audio frequency oscillation, which in turn is modulated upon a radio-frequency carrier common to a group of the vending positions. The signals provided by modulator devices 21, 61 are fed through respective isolating devices, in this case capacitors 22, 62 to an alternating current distribution conductor 70 used to supply electrical power to the space containing each vending position.

At a suitable point 71 a further coupling device, in this case a radio-frequency transformer 72 transfers the radio-frequency signals from conductor 70 to a receiver unit 73, which is arranged to respond to the received coded signals by advancing appropriately the readings on counter devices 74 and 75 each of which is associated with a respective vending position and is arranged to display a reading corresponding to the money value of goods withdrawn from the vending position. It will be seen that as the system transmits signals only over the already existing permanent wiring of the alternating current distribution system the cost of a separate wire network connecting the vending positions to the billing position is avoided.

It may be desirable to include radio-frequency suppressor means, such as a series choke 76 and a shunt capacitor 77 to prevent the passage of radio-frequency signals in either direction between the supply mains and the local distribution wiring, thus preventing interaction between the vending system and other sources of radio-frequency which may be coupled to the mains.

FIG. 2 shows apparatus which may be used to transmit pulses from a vending position, that is, apparatus which will perform the function of modulator unit 21 or 51 of FIG. 1.

The apparatus shown in FIG. 2 includes a free-running multivibrator including transistors 81, 82, and their associated circuit components, which develops an audio-frequency signal having an actual frequency which is determined by the adjustment of a potentiometer 83. Signals from multivibrator 81, 82 are applied by way of a filter 84, which forms the signal into a sine-wave, to an emitter-follower transistor 85 feeding a potentiometer 86. Signals taken from the slider of potentiometer 86 are applied by way of the contact **87*a* of a keying relay 87 to a modulator drive amplifier including a transistor 88 and a complementary pair of transistors 89, 90. Modulator drivers 89, 90 feed the center-tap of a modulator transformer 91 which is connected in the supply circuit of a radio-frequency oscillator transistor 92, so that the amplitude of the oscillation produced in the resonant circuit 93** of the oscillator will vary at the frequency of the audio signal.

The output power of such an arrangement using an AUY 20 radio-frequency oscillator transistor may be 30 milliwatts. A higher power could be of advantage when a distribution network of very low resistance is used to convey the signals.

The actual frequency of the radio-frequency oscillation is determined by adjustment of a slug in the core of the tuning coil 94, which also forms a winding of the feedback and output transformer 95, from one winding 96 of which the feedback signal is applied to the base of oscillator transistor 92 and from the output winding 97 of which signals are applied by way of an isolating capacitor 98 to the alternating current supply leads connected at terminals 99.

The alternating supply is also fed to a transformer 100 feeding a rectifier 101 which provides a 15-V D.C. supply for the circuits previously described. The D.C. supply to the multivibrator and its emitter-follower is stabilized by means of a resistor 102 and a Zener diode 103.

The receiver apparatus shown in FIG. 3 is coupled to the A.C. supply by way of a transformer 120 having a tuned secondary winding adjusted to the appropriate radio frequency by moving the core slug. The signal voltage appearing across a tertiary winding is applied to the base of an amplifier transistor 121 which has as its collector load a resonant circuit 122 which is again tuned to the appropriate radio frequency. From a secondary winding coupled to resonant circuit 122 signals are fed to a rectifier diode 123 which provides across a potentiometer 124 a demodulated signal which is amplified in a boot-strapped audio amplifier including transistors 125, 126. In shunt with the emitter-lead resistor of transistor 126 is a twin-T filter 127 offering a high impedance to a predetermined audio frequency and a low impedance to other frequencies. Signals of the selected frequency are thus passed to a rectifier 128, while other signals pass through filter 127 and are applied as a negative feedback signal to the base of amplifier 125. Alternative highly-selective arrangements may be used, such as ceramic (barium titanate) filters, or piezo-electric torsional filters suitable to the frequency to be selected. The rectified audio signal is applied to a Darlington pair of transistors 129 which are thus allowed to conduct, passing current through the winding of a control relay 130, of which the contact **130*a* connects low-voltage alternating current from the secondary winding of a mains transformer 131 to output terminals 132. A diode in shunt with the winding of relay 130 prevents induced high voltages from affecting the switching transistors. The value of a capacitor 133 connected in shunt with the load resistor for rectifier diodes 128 determines the delay in operation of relay 130**. It is made high enough to prevent spurious operation of the relay by mains surges.

The apparatus described in relation to FIGS. 2 and 3 has been assumed to be at a vending position. Similar if not identical apparatus may be used to perform related functions at the central billing position. The receiver at the vending position may be used to make the machine operative only when the room is known to be occupied by a customer; other similar devices may be used to actuate other machine functions, such as the initiation of an alarm device to wake the occupant of the room at a desired time.

At the central position the various multivibrator circuits will be individually switched on as required, the switching action being arranged to light a pilot lamp showing that a particular machine is operative. Power for all the apparatus at the central position may be obtained from a common, stabilized power pack.

A common receiver circuit for each radio frequency may employ tuning arrangements similar to those described in relation to FIG. 3, but will feed a number of twin-T filters appropriate to the number of audio signals which may be provided by the machines operating on that radio frequency. To this end a follower amplifier will be introduced immediately before each filter for isolating and impedance-matching purposes. Each selected signal will be applied to actuate an appropriate device, price counter or call signal for room service, etc.

It may be found desirable to introduce automatic gain control arrangements into the receiver circuits, to make provision for the varying amplitude of signal as the load on the distribution network is varied.

It will be appreciated that the specific embodiments described above are given by way of example only and that the invention may be carried out by other circuit devices known to those skilled in the art.

I claim:

1. Vending and sales recording apparatus useable in multiroom transient housing, including hotels, comprising in combination:

a power line;

a plurality of vending machines energizable from said power line, each vending machine having a plurality of vending units, each vending unit being actuable on demand for dispensing items of goods or the like;

means in each vending unit responsive to such dispensing for then providing pulses as a signal representing the cost of the item of goods dispensed by said vending unit, there being in a one of such vending machines plural ones of said means providing different signals representing different costs;

a low frequency modulator means for each vending machine and connected to the vending units thereof, said low frequency modulator means including an audio-frequency source and means for modulating the output of said audio-frequency source with said pulse signal to produce a pulse modulated audio signal;

a high frequency modulator means connected to said low frequency modulator means and including a carrier frequency source and means for modulating the output of said carrier frequency source with said pulse modulated audio signal to produce a modulated carrier signal;

means coupling said modulated carrier signal to said power line;

a central control unit having a receiver means coupled to said power line and including carrier frequency demodulating means for separating said audio frequencies from said carrier frequency and means for demodulating a selected one of said audio signals to provide a cost signal;

a counter responsive to the cost signal output from a given receiver and audio demodulating means thereof for summing the cost of articles dispensed by a given vending machine as they are dispensed;

vending machine enabling means for controlling energization of the vending machines.

2. Vending and recording apparatus as claimed in claim 1 wherein said receiver means further includes a radio frequency tuning means and filtering means for selecting the required carrier frequency signals.

3. Vending and recording apparatus as claimed in claim 1 including a radio frequency transformer coupling said receiver means to said power line.

4. Vending and recording apparatus as claimed in claim 1 in which said plurality of vending machines includes at least one group of machines, each said group including a least one said machine, said receiver means including a remote signal receiver for each said group of machines, said means coupling said modulated carrier signal being a capacitive coupling.

5. Vending and recording apparatus as claimed in claim 4 wherein said power line is part of a power distribution circuit also connected to domestic consumer equipment.

6. Vending and recording apparatus as claimed in claim 1 wherein said audio frequency source includes a transistor multivibrator developing an audio-frequency signal, the frequency of which is adjustable.

7. Vending and recording apparatus as claimed in claim 6 in which said carrier frequency source comprises a radio frequency oscillator, and said means for modulating the output of said carrier frequency source comprises a modulator transformer and a modulator drive amplifier receiving said pulse modulated audio signal, the output of said modulator drive amplifier being coupled to said modulator transformer, the output of said modulator transformer being coupled to said radio frequency oscillator, said radio frequency oscillator having a resonant circuit producing the modulated carrier signal.

8. Vending and recording apparatus as claimed in claim 7, in which said radio frequency oscillator includes an oscillator transistor and said resonant circuit includes a radio frequency oscillator transformer and including radio frequency adjusting means associated with said radio frequency oscillator transformer, a winding of which supplies a feedback signal to said oscillator transistor.

* * * * *